(12) United States Patent
Steinberger et al.

(10) Patent No.: US 10,012,083 B2
(45) Date of Patent: Jul. 3, 2018

(54) TORQUE CONVERTER TURBINE INCLUDING ADDED MASS

(71) Applicant: Schaeffler Technologies AG & Co. KG, Herzogenaurach (DE)

(72) Inventors: Markus Steinberger, Macedonia, OH (US); Timothy Hess, Westlake, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 204 days.

(21) Appl. No.: 15/066,005

(22) Filed: Mar. 10, 2016

(65) Prior Publication Data

US 2017/0260862 A1 Sep. 14, 2017

(51) Int. Cl.
| | |
|---|---|
| *F16D 33/18* | (2006.01) |
| *F01D 5/04* | (2006.01) |
| *F16H 41/28* | (2006.01) |
| *F01D 5/30* | (2006.01) |
| *F16H 41/04* | (2006.01) |
| *F16H 41/24* | (2006.01) |
| *F16H 45/02* | (2006.01) |

(52) U.S. Cl.
CPC ............... *F01D 5/048* (2013.01); *F01D 5/30* (2013.01); *F16D 33/18* (2013.01); *F16H 41/04* (2013.01); *F16H 41/24* (2013.01); *F16H 41/28* (2013.01); *F16H 2041/243* (2013.01); *F16H 2045/021* (2013.01); *F16H 2045/0226* (2013.01); *F16H 2045/0263* (2013.01); *F16H 2045/0294* (2013.01)

(58) Field of Classification Search
CPC ........... F16D 31/18; F16H 41/24; F16H 41/28
USPC ............................................................. 60/330
See application file for complete search history.

(56) References Cited

U.S. PATENT DOCUMENTS

| | | | | |
|---|---|---|---|---|
| 5,195,621 A | * | 3/1993 | Dull ........................ | F16H 45/02 192/3.29 |
| 6,648,112 B2 | * | 11/2003 | Suzuki .................... | F16H 45/02 192/212 |
| 7,014,426 B2 | * | 3/2006 | Schultz ................... | F16H 41/28 60/330 |
| 8,135,525 B2 | | 3/2012 | Swank et al. | |

\* cited by examiner

*Primary Examiner* — Michael Leslie
(74) *Attorney, Agent, or Firm* — Davidson, Davidson & Kappel, LLC

(57) ABSTRACT

A torque converter turbine is provided. The torque converter turbine includes a plurality of blades, an annular bowl shaped blade supporting portion supporting the blades and a mass fixed to the blade supporting portion. A method of forming a torque converter turbine is also provided. The method includes providing a blade supporting portion of a turbine shell with mass and connecting a plurality of blades to the blade supporting portion.

20 Claims, 5 Drawing Sheets

TORQUE CONVERTER TURBINE INCLUDING ADDED MASS

The present disclosure relates generally to torque converters and more specifically to turbines of torque converters.

BACKGROUND

U.S. Pat. No. 8,135,525 discloses a torque converter including a conventional turbine with no added mass.

SUMMARY OF THE INVENTION

A torque converter turbine is provided. The torque converter turbine includes a plurality of blades, an annular bowl shaped blade supporting portion supporting the blades and a mass fixed to the blade supporting portion.

A torque converter including the torque converter turbine is also provided.

A method of forming a torque converter turbine is also provided. The method includes providing a blade supporting portion of a turbine shell with mass and connecting a plurality of blades to the blade supporting portion.

BRIEF DESCRIPTION OF THE DRAWINGS

The present invention is described below by reference to the following drawings, in which:

FIG. 4b shows a perspective view of a turbine shell of the turbine shown in FIG. 4a.

DETAILED DESCRIPTION

The disclosure provides a turbine having increased inertia compared to a conventional turbine. To increase inertia on the turbine to improve NVH, a mass ring is stamped matching the torus contour profile. The mass ring outer diameter covers the turbine blade completely. The mass ring inner diameter covers at least a portion of the blade, and in at least one embodiment fully cover the blade. Blade tabs reach through slots in the mass ring to connect by folding the tabs and subsequent brazing. Advantageously, the mass ring inside the turbine shell may allow for connection to the turbine and blades by brazing so that no additional processes are required.

Figure 1:
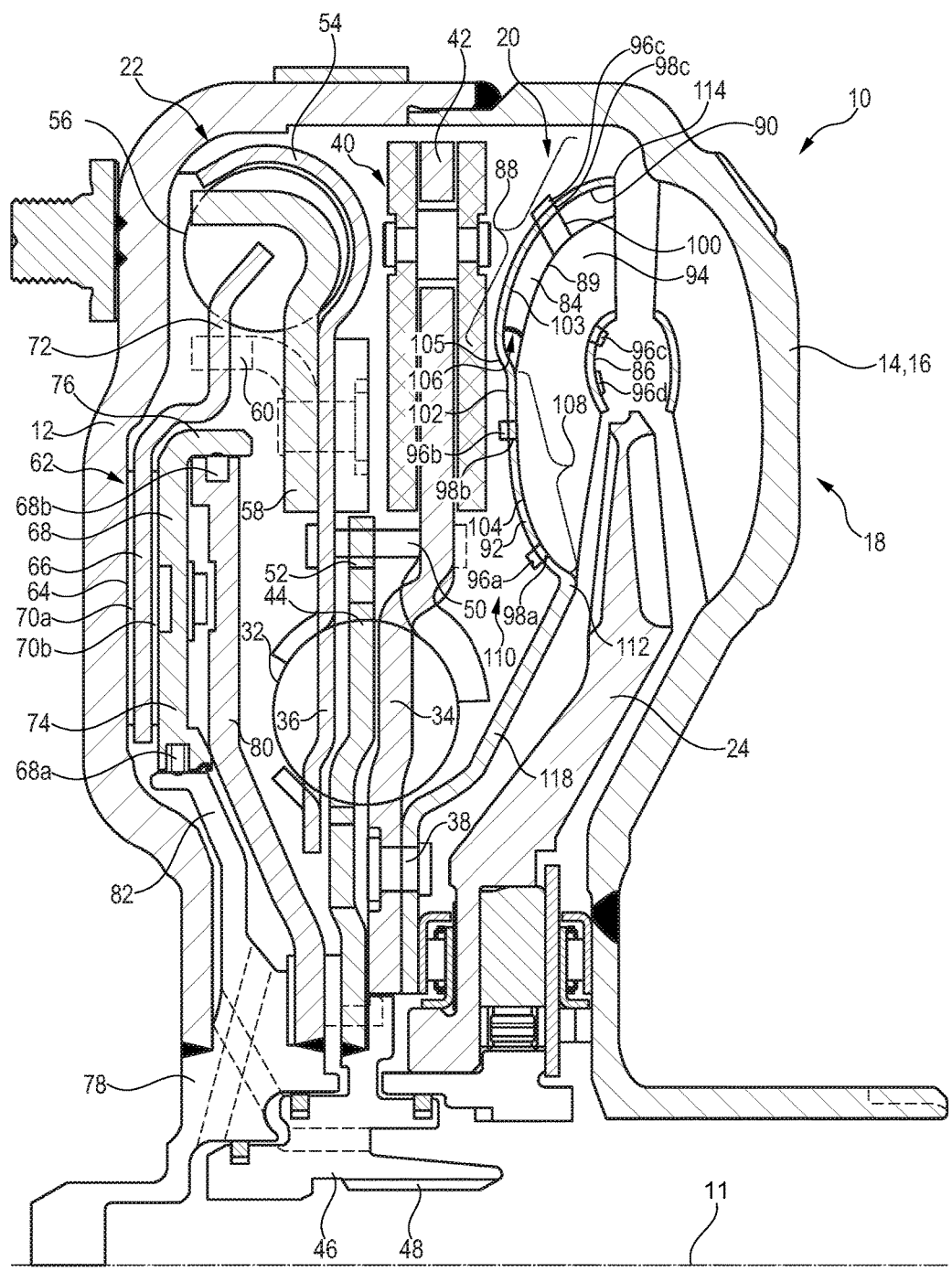
FIG. 1 schematically shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 formed in accordance with an embodiment of the present invention, which is positioned opposite impeller 18, and a damper assembly 22 fixed to turbine 20. Torque converter 10 further includes a stator 24 axially between impeller 18 and turbine 20.

On a front-cover side of turbine 20, turbine 20 is connected to damper assembly 22. Damper assembly 22 includes two cover plates 34, 36 supporting an inner set of springs 32 axially therebetween, with the turbine-side cover plate 34 being riveted to turbine 20 by a plurality of circumferentially spaced rivets 38. Damper assembly 22 further includes a centrifugal pendulum vibration absorber 40 at a radially outer end 42 of cover plate 34 and a drive flange 44 positioned axially between cover plates 34, 36. Drive flange 44 includes a drive hub 46 at an inner radial end thereof including splines 48 on an inner circumferential surface thereof configured for nonrotatably connecting to a transmission input shaft. Cover plates 34, 36 transfer torque from turbine 20 to drive flange 44 via springs 32. Drive flange 44 in turn drives the transmission input shaft via hub 46. Radially outside of springs 32, cover plates 34, 36 are riveted together by a plurality of circumferentially spaced rivets 50. Rivets 50 pass through cover plates 34, 36 into circumferential spaces formed between outer tabs 52 extending from a radial outer end of drive flange 44.

A radially outer end of cover plate 36 forms a spring retainer 54 retaining a set of radially outer springs 56. A further plate 58 of damper assembly 22 is riveted to a front cover side of cover plate 36 and extends into circumferential spaces between springs 56 to contact circumferential ends of springs 56. Plate 58 further includes projections 60 extending axially away from cover plate 36.

Torque converter 10 also includes a lockup clutch 62 formed by an inner axial surface 64 of front cover 12, a clutch plate 66 and a piston 68. Clutch plate 66 includes friction material 70a, 70b on both axial surfaces thereof. A first friction material 70a is configured for contacting inner axial surface 64 and a second friction material 70b is configured for contacting piston 68. Clutch plate 66 further includes drive projections 72 on a radial outer end thereof extending through circumferential spaces between projections 60 and into the circumferential spaces between springs 56. Piston 68 includes a radially extending section 74 and an axially extending section 76 extending axially from an outer radial end of section 74. A hub section 78 of front cover 12 is configured as a support for piston 68, with hub section 78 being axially fixed and piston 68 being axially slidable with respect to hub section 78. Piston 68 is provided with a radially inner seal 68a, held in a groove of piston 68, at an inner circumferential surface of radially extending section 74 and a radially outer seal 68b, provided in a groove of a first radial extension 80 fixed to hub section 78, at an inner circumferential surface of axially extending section 76. First radial extension 80 and a second radial extension 82, which is part of hub section 78, form seal plates for slidably supporting piston 68. First and second seal plates 80, 82 are axially and radially fixed in place in torque converter 10 and piston 68 is axially movable along seals 68a, 68b with respect to first and second seal plates 80, 82.

In accordance with an embodiment of the present invention, turbine 20 is also provided with an added mass 84 in comparison with a conventional turbine. In this embodiment, mass 84 is ring shaped and extends continuously around center axis 11 of torque converter 10. Mass 84 is fixed to a radially outer section 88 of a transmission side surface 90 of a turbine shell 92, with a transmission side surface 89 of mass 84 facing a plurality of turbine blades 94. Blades 94 are each fixed to turbine shell 92 at an engine side thereof by tabs 96a, 96b, 96c and are each fixed to a core ring 86 at a transmission side thereof by tabs 96d, 96e. A radially inner tab 96a and a radially intermediate tab 96b are each of a first length, i.e., a conventional length, and extend through respective holes 98a, 98b formed in turbine shell 92. In contrast, a radially outer tab 96c is longer than tabs 96a, 96b and extends through a hole 100 in mass 84 and then through a hole 98c formed in turbine shell 92. Tabs 96a, 96b, 96c are bent to contact an engine side surface 102 of turbine shell 92. Mass 84 is connected to shell 92 by inserting each of tabs 96c through the respective hole 100 while tabs 96a, 96b, 96c are inserted through holes 98a, 98b, 98c when tabs are straight, then bending tabs 96a, 96b, 96c against engine side surface 102. Tabs 96a, 96b, 96c are then brazed to engine side surface 102 such that mass 82 is fixed to radially outer section 88 by tabs 96a, 96b, 96c and a braze material.

To allow mass 84 to be positioned such that transmission side surface 89 of mass 84 is aligned with and contours to a curved engine side surface 104 of blades 94 from which tabs 96a, 96b, 96c protrude, radially outer section 88 of turbine shell 92, at a radially inner end 105 thereof, juts away from blades 94 to provide an annular gap 106 between blades 94 and transmission side surface 90 of turbine shell 92 in which mass 84 is positioned. At a radially inner section 108 of turbine shell 92, transmission side surface 90 follows a contour of and contacts curved engine side surface 104 of blades 94. Radially outer section 88 and radially inner section 108 together form an annular bowl shaped blade supporting portion 110 of turbine 20 having a cross-section that begins at a radially inner edge 112 of radially inner section 108, while extending radially outward, curves axially toward damper assembly 22, transitions from radially inner section 108 to radially outer section 88 and juts further axially toward damper assembly 22 at radially inner end 105 of radially outer section 88, before curving back towards impeller 18 to form a radially outer edge 114 of radially outer section 88.

Radially inner section 108 directly supports blades 94 with both engine side surface 102 of turbine shell 92 and transmission side surface 90 of turbine shell 92 via contact with tabs 96a, 96b, 96c at engine side surface 102 and via contact with curved engine side surface 104 of blades 94 at transmission side surface 90. Radially outer section 88 directly supports blades 94 via contact with tabs 96a, 96b, 96c at engine side surface 102 of turbine shell 92 and indirectly supports blades 94 at transmission side surface 90 of turbine shell 92 via contact with an engine side surface 103 of mass 84, which directly supports curved engine side surface 104 of blades 94. Mass 84 advantageously increases an inertia of turbine 20.

Turbine 20 further includes a connecting portion 118 extending radially inward from radially inner edge 112 of radially inner section 108. A radially inner end of connecting portion 118 is fixed to a radially inner end of cover plate 34 by a plurality of circumferentially spaced rivets 38 to fix turbine 20 to damper assembly 22.

Figure 2:
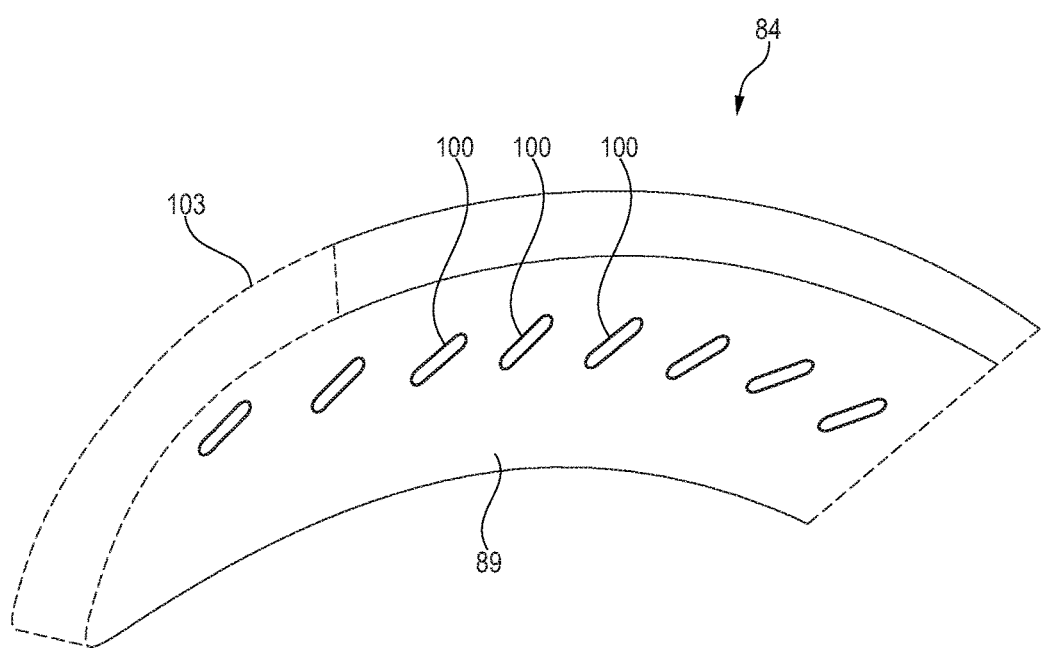
FIG. 2 shows a cross-sectional perspective view of a mass of a turbine of the torque converter shown in FIG. 1.

FIG. 2 shows a cross-sectional perspective view of mass 84. As shown in FIG. 2, a plurality of circumferentially spaced holes 100 are provide in mass 84, extending from transmission side surface 89 of mass 84 to engine side surface 103 of mass 84. Transmission side surface 89 of mass 84 has a similar contour as engine side surfaces 104 of blades 94 (FIG. 1), which allows engine side surfaces 104 of blades 94 to be pressed flush against transmission side surface 89 of mass 84. Engine side surface 103 has a similar contour as transmission side surface 89.

Figure 3:
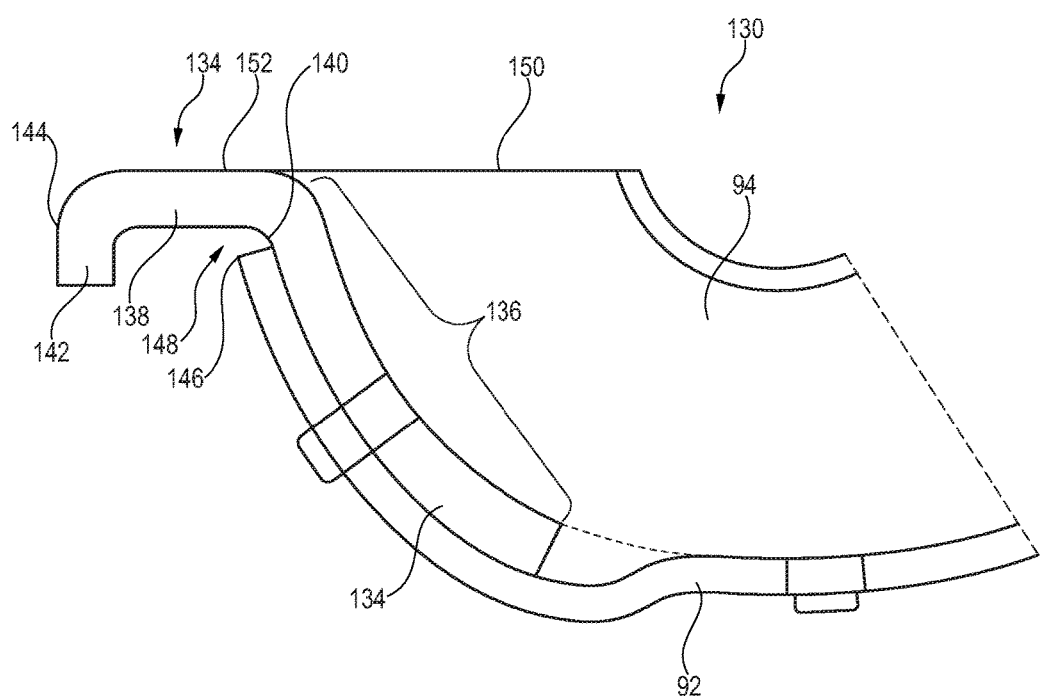
FIG. 3 shows a cross-sectional side view of a turbine in accordance with a second embodiment of the present invention.

FIG. 3 shows a cross-sectional side view of a turbine 130 in accordance with a second embodiment of the present invention. Turbine 130 is formed in the same manner as turbine 20, except that turbine 130 includes a mass 132 including an outer radial protrusion 134 extending radially outside of blade supporting portion 110 of turbine shell 92. In this embodiment, outer radial protrusion 134 is annular in shape and extends continuously around center axis 11 (FIG. 1); however, in other embodiments, outer radial protrusion 134 may be formed of a plurality of arc-shaped circumferentially spaced sections. Mass 132 includes a base portion 136 that is the same shape as mass 84, with outer radial protrusion 134 extending radially outward from base portion 136. In this embodiment, outer radial protrusion 134 includes a radially extending section 138 connected directly to a radially outer edge 140 of base portion 136 and an axially extending section 142 extending axially at a radially outer edge 144 of radially extending section 138. To allow outer radial protrusion 134 to extend radially past turbine shell 92, at an outermost circumferential surface 146 thereof, turbine shell 92 is provided with cutouts 148. In contrast to a conventional turbine, where the outermost circumferential surface is aligned radially with a straight transmission side surface 150 of turbine blades 94 outermost circumferential surface 146 is axially offset from straight transmission side surface 150 of turbine blades 94 due to cutouts 148. Cutouts 148 also allow a transmission side radially extending surface 152 of outer radial protrusion 134 to be radially aligned with straight transmission side surface 50.

Figure 4A:
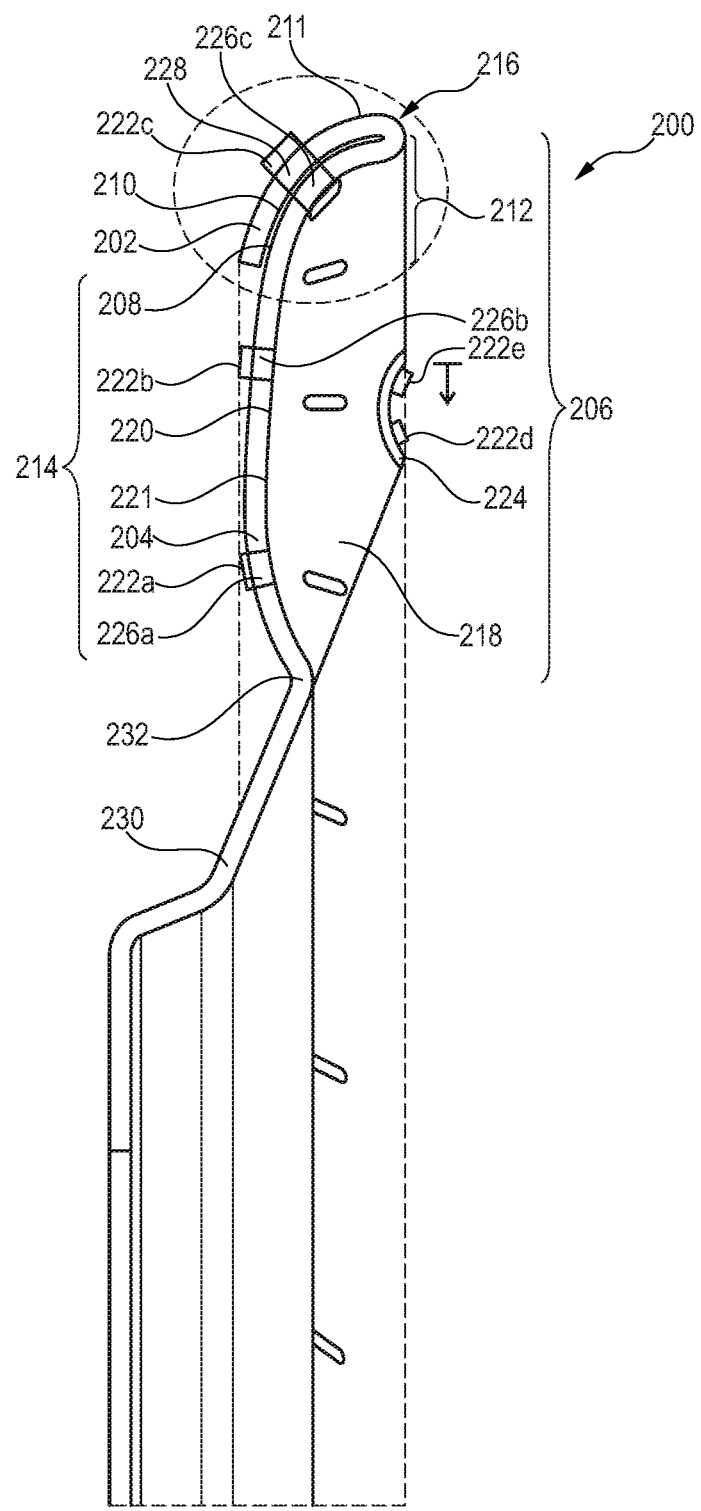
FIG. 4a shows a cross-sectional side view of a turbine in accordance with a third embodiment of the present invention.
Figure 4B:
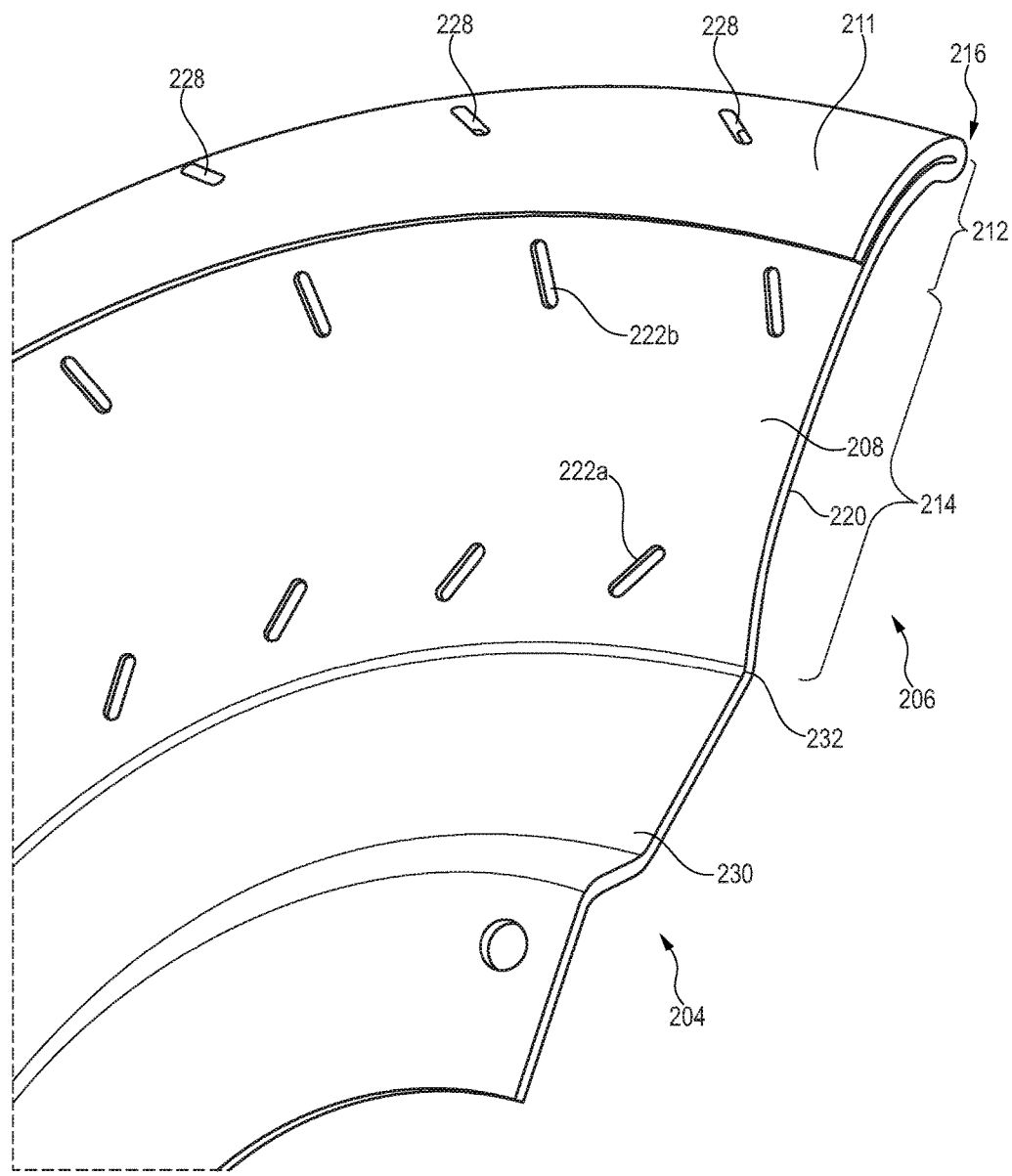

FIG. 4a shows a cross-sectional side view of a turbine 200 in accordance with a third embodiment of the present invention and FIG. 4b shows a perspective view of a turbine shell 204 of turbine 200. Turbine 200 is provided with a mass 202 formed integrally with turbine shell 204. At an outer diameter thereof, an annular bowl shaped blade supporting portion 206 of turbine shell 204 transitions to mass 202, which is folded back onto an engine side surface 208 of blade supporting portion 206. More specifically, a transmission side surface 210 of mass 202 is brought into contact with engine side surface 208 of blade supporting portion 206. An engine side surface 211 of mass 202 forms an outer circumferential surface of turbine 200. Mass 202 is formed to be the same thickness as the remainder of turbine shell 204 such that at a radially outer section 212 of blade supporting portion 206, turbine shell 204 is twice as thick as a radially inner section 214 that is radially inside of radially outer section 212. In other embodiments, mass 202 may be thinner or thicker than radially inner section 214 depending on desired amount of inertia to be added. Radially outer section 212, at a radially outer edge thereof, merges with mass 202 at a U-shaped bend 216. Radially outer section 212 and radially inner section 214 together form the entirety of blade supporting portion 206.

Turbine 200 includes a plurality of blades 218 contacting and supported by a transmission side surface 220 of blade supporting portion 206. Engine side surfaces 221 of blades 218 are pressed flush against transmission side surface 220. Blades 218 are each fixed to turbine shell 204 at an engine side surface thereof by tabs 222a, 222b, 222c and are each fixed to a core ring 224 at a transmission side thereof by tabs 222d, 222e. A radially inner tab 222a and a radially intermediate tab 222b are each of a first length, i.e., a conventional length, and extend through respective holes 226a, 226b formed in turbine shell 204. In contrast, a radially outer tab 222c is longer than tabs 222a, 222b and extends through a hole 228 in mass 202 and then through a hole 226c formed in blade supporting portion 206. Tabs 222a, 222b are bent to contact engine side surface 208 of blade supporting portion 206 and tabs 222c are bent to contact engine side surface 211 of mass 202. Mass 202 is connected to shell 204 by inserting each of tabs 222c through the respective hole 228 while tabs 222a, 222b, 222c are inserted through holes 226a, 226b, 226c when tabs 222a, 222b, 222c are straights, then bending tabs 222a, 222b against engine side surface 208 of blade supporting portion 206 and bending tabs 222c against engine side surface 211 of mass 202. Tabs 222a, 222b, 222c are then brazed to engine side surface 102 to connect tabs 222a, 222b, 222c to mass 202 via a braze material.

Turbine 200 further includes a connecting portion 230 extending radially inward from a radially inner edge 232 of radially inner section 214. A radially inner end of connecting portion 230 is configured for fixing to a radially inner end of cover plate 34 (FIG. 1) by a plurality of circumferentially spaced rivets 38 (FIG. 1) to fix turbine 200 to damper assembly 22 (FIG. 1).

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter turbine comprising:
a plurality of blades;
an annular bowl shaped blade supporting portion supporting the blades; and
a mass fixed to the blade supporting portion, wherein the blades each include a first tab for connecting the respective blade to the blade supporting portion, the mass including a plurality of holes, each of the first tabs passing through one of the holes in the mass.

2. The torque converter turbine as recited in claim 1 wherein the blade supporting portion consists of a radially inner section and a radially outer section, the mass being fixed to the radially outer section.

3. The torque converter turbine as recited in claim 2 wherein the mass has an annular shape that contours to the shape of the radially outer section of the blade supporting portion.

4. The torque converter turbine as recited in claim 1 wherein the blade supporting portion includes a plurality of first and second holes formed therein, each of the blades including at least one second tab, each of the first tabs passing through one of the first holes in the blade supporting portion, each of the second tabs passing through one of the second holes in the blade supporting portion.

5. The torque converter turbine as recited in claim 4 wherein the first tabs are longer than the second tabs.

6. The torque converter turbine as recited in claim 1 wherein the mass is formed as a piece separate from the blade supporting portion.

7. The torque converter turbine as recited in claim 6 wherein the separate piece of the mass is fixed to the blade supporting portion by the tabs of the blades and a braze material.

8. The torque converter turbine as recited in claim 1 wherein the mass is formed integrally with the blade supporting portion as a single piece.

9. The torque converter turbine as recited in claim 8 wherein the mass contacts an engine side surface of the blade supporting portion.

10. The torque converter turbine as recited in claim 9 wherein the mass is folded back onto the engine side surface of the blade supporting portion such that the mass merges with the blade supporting portion at a U-shaped bend.

11. The torque converter turbine as recited in claim 1 wherein the mass is fixed against a transmission side surface of the blade supporting portion.

12. The torque converter turbine as recited in claim 11 wherein a radially outer section of the blade supporting portion, at a radially inner end thereof, juts away from the blades to provide a gap between the blades and a transmission side surface of the radially outer section, the mass being positioned in the gap.

13. The torque converter turbine as recited in claim 1 wherein the mass includes an outer radial protrusion extending radially outside of the blade supporting portion.

14. A torque converter comprising the torque converter turbine as recited in claim 1.

15. A method of forming a torque converter turbine comprising:
providing an annular bowl shaped blade supporting portion of a turbine shell with a mass on a transmission side or an engine side of the annular bowl shaped portion; and
connecting a plurality of blades to the blade supporting portion, wherein the connecting the plurality of blades to the blade supporting portion includes contacting the mass with the each of the blades.

16. The method as recited in claim 15 wherein the mass includes a plurality of holes and each of the blades includes a first tab, the connecting the plurality of blades to the blade supporting portion includes inserting each of the first tabs through a respective one of the holes of the mass.

17. The method as recited in claim 16 wherein the contacting the mass with the each of the blades includes bending the first tabs against an engine side surface of the mass.

18. The method as recited in claim 16 wherein the blade supporting portion includes a plurality of holes formed therein, each of the blades including at least one second tab, the connecting the plurality of blades to the blade supporting portion includes inserting each of the first tabs and the second tabs through a respective one of the holes of the blade supporting portion.

19. The method as recited in claim 15 wherein the contacting the mass with the each of the blades includes pressing an engine side surface of each of the blades flush against a transmission side surface of the mass.

20. A torque converter turbine comprising:
a plurality of blades;
an annular bowl shaped blade supporting portion supporting the blades; and
a mass fixed to the blade supporting portion, the mass being formed integrally with the blade supporting portion as a single piece, the mass being folded back onto a surface of the blade supporting portion such that the mass merges with the blade supporting portion at a U-shaped bend.

* * * * *